Figure 1:
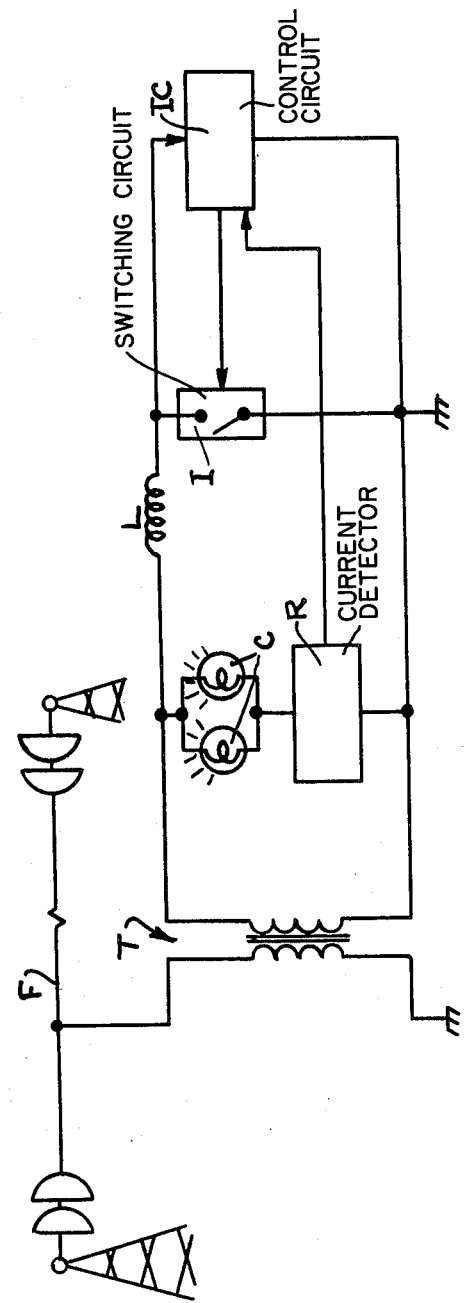

United States Patent [19]

Berthiaume

[11] 4,240,025

[45] Dec. 16, 1980

[54] FEEDING SYSTEM FOR INCANDESCENT LAMPS BY OVERHEAD WIRES OF TRANSMISSION LINES

[75] Inventor: Raymond Berthiaume, Ste-Julie, Canada

[73] Assignee: Hydro-Quebec, Montreal, Canada

[21] Appl. No.: 942,976

[22] Filed: Sep. 18, 1978

[30] Foreign Application Priority Data

Apr. 13, 1978 [CA] Canada .................................. 301090

[51] Int. Cl.³ .................... H05B 41/392; H02J 11/00; G05F 1/44
[52] U.S. Cl. ...................................... 323/8; 315/306; 323/34
[58] Field of Search .................... 307/109, 149; 323/8, 323/24, 34, 36; 315/283, 284, 306, 310

[56] References Cited

U.S. PATENT DOCUMENTS

| | | | |
|---|---|---|---|
| 3,259,762 | 7/1966 | Skuderna | 307/109 |
| 3,421,027 | 1/1969 | Maynard et al. | 323/36 X |
| 3,426,263 | 2/1969 | Hennigan et al. | 323/8 X |
| 3,430,101 | 2/1969 | Biltz | 323/36 X |
| 3,678,371 | 7/1972 | Nuckolls | 323/8 X |
| 3,729,651 | 4/1973 | Fricker et al. | 323/8 X |
| 3,781,690 | 12/1973 | Corson | 323/8 X |
| 3,914,685 | 10/1975 | Van Gilder | 323/20 |
| 3,939,396 | 2/1976 | Larson | 323/8 |
| 3,944,909 | 3/1976 | Reymond | 323/8 X |

FOREIGN PATENT DOCUMENTS

2103533  8/1971  Fed. Rep. of Germany .

OTHER PUBLICATIONS

Tacx, "Elektrostatische Inductie Als Voedingsbron", Polytechnisch Tijd schrift, vol. 19e, Sep. 16, 1964, pp. 657e–659e.

Gessen et al., "Transformator für Kapazitive Leistungsentnahme aus Hochspannungsleitungen", Elektrotechnik, vol. 7, No. 6, Jun., 1953, pp. 255-259.

*Primary Examiner*—A. D. Pellinen
*Attorney, Agent, or Firm*—Schwartz, Jeffery, Schwaab, Mack, Blumenthal & Koch

[57] ABSTRACT

A system for energizing incandescent lamps of beacons by means of the capacitive energy extracted from an insulated section of the overhead wire of power transmission lines to which the wire is capacitively coupled. The supply system comprises a device for transforming the AC energy from the overhead wire into an AC current which feeds at least one of the incandescent lamps and a regulation circuit mounted in shunt with the transforming device so as to control the current flow through those lamps. Current regulation is carried out by means of switching circuit having a switching time governed by a control circuit. In addition, the control circuit includes an integrator circuit which actually controls the switching time of the switching circuit and a comparator circuit which ensures the forming of symmetrical waveforms at the input of that switching circuit.

11 Claims, 2 Drawing Figures

FEEDING SYSTEM FOR INCANDESCENT LAMPS BY OVERHEAD WIRES OF TRANSMISSION LINES

The present invention concerns a system for feeding beacons provided with incandescent lamps by an energy source constituted of an insulated section of the overhead wire of a power transmission line.

It is of a current practice to use beacons of incandescent lamps to indicate the presence of towers supporting bundles of conductors in energy transmission lines. Those beacons which are fixed to the towers operate not only to indicate to aircraft pilots the presence of such a tower, but also serve as position indicators for maintenance and repair teams. Up till now, the beacons were supplied in power either by means of a secondary supply line from a substation or by means of engine-driven generators, at remote locations. However, either one of those feeding methods presents severe economic and technical disadvantages in terms of installation and maintenance costs in addition to being of a low realiability as a source of constant supply.

The prime object of the present invention resides in a system which obviates the disadvantages above-mentioned in connection with the conventional supply systems and advocates a system capable of feeding incandescent beacons directly from the overhead wire of power transmission lines.

The overhead wire is that conductor hung at the peak of the towers and which serves mainly to protect the bundles of conductors against lightning. That overhead wire is normally grounded and is therefore not utilized to convey any electrical energy. However, since being in the neighbourhood of the underlying bundles of high-voltage conductors, a given amount of energy is actually induced in that overhead wire through capacitive coupling. By insulating a given section length of the overhead wire, it is then possible to tap such induced energy without hampering the protection function of that wire. For that purpose, the present invention advocates a feeding system provided with shunt means for regulating the power supplied to the incandescent lamps, through an electronic unit requiring substantially low maintenance, of high reliability and of relatively low cost.

More specifically, the present invention resides in a system for feeding the incandescent lamps of beacons with the energy induced through capacitive coupling in an insulated section of the overhead wire of transmission lines. The system comprises means for transforming the energy induced in the overhead wire into an AC current; and a regulation circuit mounted in shunt with the transforming means for controlling the flow of AC current feeding at least one incandescent lamp.

The present invention also resides in a method for feeding the incandescent lamps, carried out by the above system.

Figure 2:
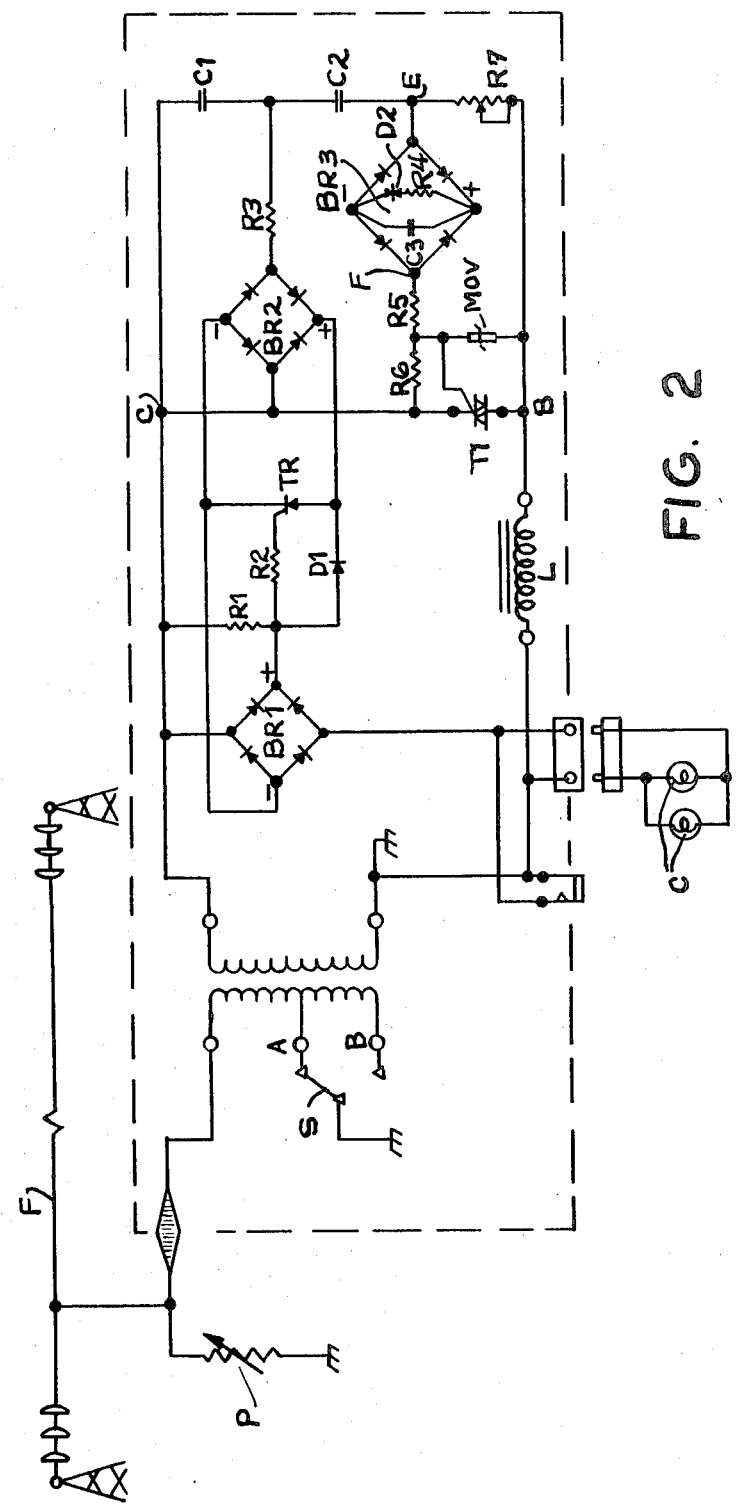

A preferred embodiment of the present invention will be hereinafter described with reference to the accompanying drawings, wherein:

FIG. 1 is a block diagram of the feeding system provided with shunt switching regulation to energize incandescent lamps of beacons; and FIG. 2 shows a detailed diagram of the feeding system of FIG. 1.

FIG. 1 schematically illustrates a system for feeding incandescent beacons with the energy tapped from an overhead wire. As shown, a voltage step-down transformer T has its primary winding connected between an insulated section of the overhead wire F and ground to generate through its secondary a current feeding the incandescent lamps C, the latter being mounted in series with a current detector R. The power delivered to the incandescent lamps C is regulated by a shunt switching circuit I which is controlled by control circuit IC. This control circuit is formed of a comparator part and an integrator part. In addition, a smoothing inductance L is connected in series with the switching circuit I to prevent steep current variations in that switching circuit.

In normal operation, the current supplied by the secondary of transformer T flows freely through the incandescent lamps C whenever the switch I is in open position. When the switch I is closed by the control circuit IC, a short circuit is formed across the secondary winding of transformer T, thereby routing to ground the energy then extracted from the overhead wire F, which results in a nul current through lamps C and detector R.

In addition, whenever the incandescent lamps C become inoperative, the current detector R, which is then an open circuit, acts on the control circuit IC so as to advance the switching time of shunt circuit I, and this at each half-cycle of the source current. Such advance in the switching time of circuit I results in delivering to ground all the energy.

FIG. 2 illustrates in detail the feeding system for incandescent beacons provided with the shunt switching regulation shown in FIG. 1. Proper regulation is achieved as follows. At the starting of the first positive half-cycle, the current supplied from the secondary winding of transformer T flows through the diode bridge $BR_1$ and resistance $R_2$ to feed the trigger electrode of thyristor TR which then becomes conductive. Thyristor TR being conductive, the diode bridges $BR_1$ and $BR_2$ as well as capacitor $C_1$, all these being connected in parallel with thyristor TR, are short-circuited so that incandescent lamps C are then supplied in power through the loop formed by bridge $BR_1$, diode $D_1$, thyristor TR and the negative terminal of bridge $BR_1$.

The regulation of the power delivered to the incandescent lamps C is achieved by means of a switching circuit connected across terminals B-C, through the secondary windings of transformer T thus short-circuiting incandescent lamps C from the current detection circuit formed of bridges $BR_1$ and $BR_2$ and their associated elements. The switching circuit is constituted of a bidirectional thyristor or triac TI, of a MOV and of resistances $R_5$ and $R_6$. The firing of triac TI is commanded by a control circuit which comprises an integrator formed of a variable resistance $R_7$ and of a capacitor $C_2$, and by a comparator including diode bridge $BR_3$, diac $D_2$, resistance $R_4$ and capacitor $C_3$.

During the positive half-cycle, capacitor $C_2$ of the integrating circuit is charged to a voltage determined by diac $D_2$ which becomes conductive when the voltage at terminal E of the comparator reaches a predetermined threshold voltage value. Capacitor $C_3$ mounted in parallel with diac $D_2$ acts as a filter for the transient waves and determines, together with resistance $R_4$, the conducting time of diac $D_2$. Resistance $R_4$ in series with diac $D_2$ limits the intensity of the input current. When diac $D_2$ becomes conductive, the positive and negative terminals of bridge $BR_3$ are then short-circuited and the voltage in E is applied at terminal F of that bridge. Then, a pulse energizes the trigger electrode of triac TI which becomes conductive, thus short-circuiting the incandescent lamps C as well as the current detector, to deliver to ground the energy tapped from the overhead wire by the step-down transformer T. The smoothing inductance L, connected between triac TI and ground, prevents any steep change in the current and protects both the secondary of the step-down transformer and the thyristor against peak voltages. Resistance $R_5$ serves to limit the supply in current to the trigger electrode of triac TI whereas the MOV element in parallel with the triac acts as an over-voltage protection element which operates as a double polarity Zener diode. Resistance $R_6$ connected between one of the electrodes of the triac and its trigger electrode ensures a nul current therethrough before its turning on. When the voltage at the secondary of transformer T crosses zero, triac TI then returns to its non-conductive state.

At the beginning of each next negative half-cycle, triac TI remains non-conductive and incandescent lamps C are again supplied for a time interval determined by the charging time of capacitor $C_2$. Once capacitor $C_2$ has been charged to a voltage predetermined by the comparator circuit, triac TI is turned on again to limit the current delivered to incandescent lamps C.

Thus, during each positive or negative half-cycle, triac TI, when energized, is used to regulate the energy through the incandescent lamps C by short-circuiting the secondary winding of the step-down transformer T, which results effectively in limiting the power delivered to the incandescent lamps C.

In the case where the incandescent lamps C become inoperative, that is when they are open circuit, no current then flows through the diode bridges $BR_1$ and $BR_2$ of the current detector so that thyristor TR remains blocked. In this case, the integrator circuit is formed of capacitors $C_1$ and $C_2$ in series and variable resistance $R_7$ the value of which is adjusted according to the length of the insulated section of the overhead wire. The insertion of capacitor $C_1$ results in a decrease in the time constant of the firing circuit of thyristor TI, that constant being then advanced in time. The value of capacitor $C_1$ is selected so as to actuate triac TI at the beginning of each half-cycle to divert to ground all the energy tapped from the overhead wire.

In addition, a lightning arrester P, connected between the overhead wire and ground, is provided in order to ensure the protection function of that wire in respect of the power transmission line. Moreover, according to the length of the insulated section of the overhead wire used, the number of turns forming the primary winding of transformer T is selected by setting switch S either in position A or in position B, position A corresponding to a maximum length of overhead wire insulated.

It is understood that modifications may be made to the above-described embodiments without hampering the gist of the feeding system with shunt switching regulation of the present invention the scope of which is only limited by the claims which follow.

I claim:

1. A system for feeding incandescent lamps of beacons with capacitive energy extracted from an insulated section of the overhead wire of a power transmission line, comprising means for transforming said energy from the overhead wire into AC current supplying at least one of said incandescent lamps;

a regulation circuit mounted in shunt with said transforming circuit for controlling the flow of said AC current feeding said at least one incandescent lamp, said regulation circuit comprising a switching circuit for regulating said AC current flow and a control circuit operatively connected to said switching circuit to command the switching time thereof; and a current detection circuit mounted in series with said at least one incandescent lamp and so-connected with the control circuit as to monitor the switching time of said switching circuit, said detection circuit comprising a switching unit for feeding said incandescent lamp during a time interval determined by said control circuit of said switching circuit, said detection circuit further acting on said control circuit so as to advance the switching time of said switching circuit for diverting to ground the energy extracted from the overhead wire.

2. A feeding system as claimed in claim 1, characterized in that said transforming means includes a voltage step-down transformer.

3. A feeding system a claimed in claim 2, characterized in that said control circuit comprises an integrator circuit governing the switching time of said switching circuit.

4. A feeding system as claimed in claim 3, characterized in that said integrator circuit is formed of a capacitance connected to a variable resistance the value of which is set according to the length of said insulated section of overhead wires.

5. A feeding system system as claimed in claim 4, characterized in that said control circuit further comprises a comparator circuit for forming a symmetrical waveform at the input of said switching circuit.

6. A feeding system as claimed in claim 5, characterized in that said comparator circuit comprises a diode bridge including a clipping circuit and a capacitance mounted in parallel with that clipping circuit for filtering transient waves, 7. A feeding system as claimed in claim 1, characterized in that said switching circuit comprises a bidirectional thyristor having its trigger electrode connected to said control circuit, said thyristor being mounted in shunt with said transforming means.

8. A feeding system as claimed in claim 7, characterized in that said switching circuit further comprises an over-voltage protecting element connected in parallel with said thyristor and a resistive element ensuring a nul initial current between the cathode and the trigger electrode of said thyristor.

9. A feeding system as claimed in claim 1, characterized in that a smoothing inductance is provided in series between said switching circuit and said transforming means.

10. A feeding system as claimed in claim 1, characterized in that a protection device is mounted between the insulated section of the overhead wire and ground, said device acting as a lighting arrester.

11. A system for feeding incandescent lamps of beacons with capacitive energy extracted from an insulated section of the overhead wire of a power transmission line, comprising means for transforming said energy from the overhead wire into AC current supplying at least one of said incandescent lamps;

a regulation circuit mounted in shunt with said transforming circuit for controlling the flow of said AC current feeding said at least one incandescent lamp, said regulation circuit comprising a switching circuit for regulating said AC current flow and a control circuit operatively connected to said switching circuit to command the switching time thereof; and a current detection circuit mounted in series with said at least one incandescent lamp and so-connected with the control circuit as to monitor the switching time of said switching circuit, said detection circuit comprising two diode bridges and a thryistor switching unit connected to the two diode bridges such as to permit the feeding of said incandescent lamp during a time interval determined by said control circuit of said switching circuit, the detection circuit further acting on said control circuit so asto advance the switching time of said switching circuit for diverting to ground the energy extracted from the overhead wire.

* * * * *